United States Patent [19]

Metzger

[11] Patent Number: 4,505,260
[45] Date of Patent: Mar. 19, 1985

[54] RADIANT ENERGY DEVICE
[75] Inventor: James B. Metzger, Princeton, N.J.
[73] Assignee: Metzger Research Corporation, Princeton, N.J.
[21] Appl. No.: 406,253
[22] Filed: Sep. 9, 1982
[51] Int. Cl.³ ............................................. F24J 3/02
[52] U.S. Cl. .................................. 126/433; 126/426; 126/439; 126/440; 126/443; 350/418
[58] Field of Search ............. 126/433, 438, 439, 440, 126/441, 443, 900, 426; 350/418

[56] References Cited
U.S. PATENT DOCUMENTS

| 1,081,098 | 12/1913 | De La Garza | 126/440 X |
| 3,125,091 | 3/1964 | Sleeper | 126/440 X |
| 4,249,516 | 2/1981 | Stark | 126/439 |
| 4,289,119 | 9/1981 | Meyer | 126/440 |
| 4,341,204 | 7/1982 | Bloxsom | 126/440 |

FOREIGN PATENT DOCUMENTS

| 2618156 | 11/1977 | Fed. Rep. of Germany | 126/440 |
| 2478801 | 9/1981 | France | 126/440 |
| 7945 | 1/1981 | Japan | 126/440 |
| 23666 | 3/1981 | Japan | 126/424 |
| 190901 | 11/1982 | Japan | 350/418 |

Primary Examiner—Margaret A. Focarino

[57] ABSTRACT

Radiant energy such as solar energy is utilized to form a vapor from a liquid state of a material. Concentrated radiant energy is directed through a liquid lens to a target for absorption of the radiation. The target in this way is heated to a high temperature and produces steam or other vapor at high pressure. High efficiency at low over-all cost is achieved by (1) the direct vaporization of a liquid within a collector enclosing the target structure; (2) the recovery of energy absorbed by the liquid lens; (3) the reduction in conductive and convective heat losses in the solar collector by special enclosure of the target within the collector; (4) recovery of heat as blackbody radiation from the target by using reflective walls within the enclosure and/or permitting absorption of the blackbody radiation by the liquid lens; and (5) an optional use of a heat pump effect for increasing the output of the collector.

9 Claims, 7 Drawing Figures

RADIANT ENERGY DEVICE

FIELD OF THE INVENTION

The present invention provides the means for effective utilization of radiant energy. Sources of radiant energy include sunlight, nuclear reactors, and the combustion of fuels. Steam, that is water vapor at or near 100° C., represents the most commercially versatile form of heat and a highly desirable endproduct produced by embodiments of the present invention. Other forms of heat may also be produced. For example, the steam may be used to produce hot water. Other vapors, organic and inorganic, may also be used as the final media for transfer of heat, and the invention may be used for supplying heat to drive endothermic chemical reactions or power engines.

Solar energy is an abundant resource that requires inexpensive equipment for its economic utilization. At the present time, domestic hot water heating is the most practical widespread use for solar energy. Flatplate collectors are devices consisting of a network of tubes or pipes through which a liquid circulates to pick up heat absorbed by a blackened metal plate. The pipes must be closely spaced for thermal conduction as sunlight heats the metal plate. A great length of piping is required to cover a modest area. Because these pipes are subject to damage from freezing, an antifreeze is needed, but then the water within the pipes cannot be used directly and a heat exchanger with more plumbing is required. Even with the aluminum "tube-in-strip" design, efficiency is poor and much plumbing is required. Because a flatplate collector does not use mirrors, the heat output is low-grade, typically 120° F.

Flatplate collectors, which absorb solar energy directly and provide a moderately hot output of water, are costly, largely due to the extensive plumbing needed for transfer of heat energy to water. Flatplate collectors work poorly on intermittently sunny days because of relatively large thermal inertia. For a flatplate collector on a partly sunny day to provide useful heat, the relatively large volume of fluid within the collector must itself be heated. Energy is lost when clouds obscure the sun for a few minutes and the collector cools off.

Devices for concentrating, collecting, and utilizing solar energy are well known and are disclosed in U.S. Pat. Nos. 3,901,036, 3,965,683, and 4,249,516, for example. Lenses used in such devices tend to be impractical in collecting solar energy. Their cost is high, they are heavy and bulky, and lenses absorb a considerable amount of heat.

The present invention makes use of a liquid within a transparent glazing to provide an optically smooth surface. The liquid assumes the shape of a lens and directs radiant energy onto a target. Also, the lens is arranged to recover energy as blackbody radiation from the target. Prior art describes the use of selective surfaces that absorb solar energy but have low emissivity for wavelengths of infra-red radiation involved in loss of heat as blackbody radiation. Selective surfaces do reduce losses by blackbody radiation but do not eliminate this important loss of energy.

Concentrative solar collectors ordinarily require precision in design and construction. Mirrors have been generally the most efficient means for concentrating solar energy. While mirrors may actually be lower in cost per unit surface area than a flatplate collector, the target for absorbing the concentrated rays has generally been of high cost and relatively poor efficiency. Some systems have used special geometric designs for the mirrors that permit concentration of solar radiation onto a target without tracking the sun directly.

BRIEF DESCRIPTION OF THE DRAWINGS

The following figures show embodiments of the invention and are not meant to be limiting.

DESCRIPTION OF THE INVENTION

Figure 1:
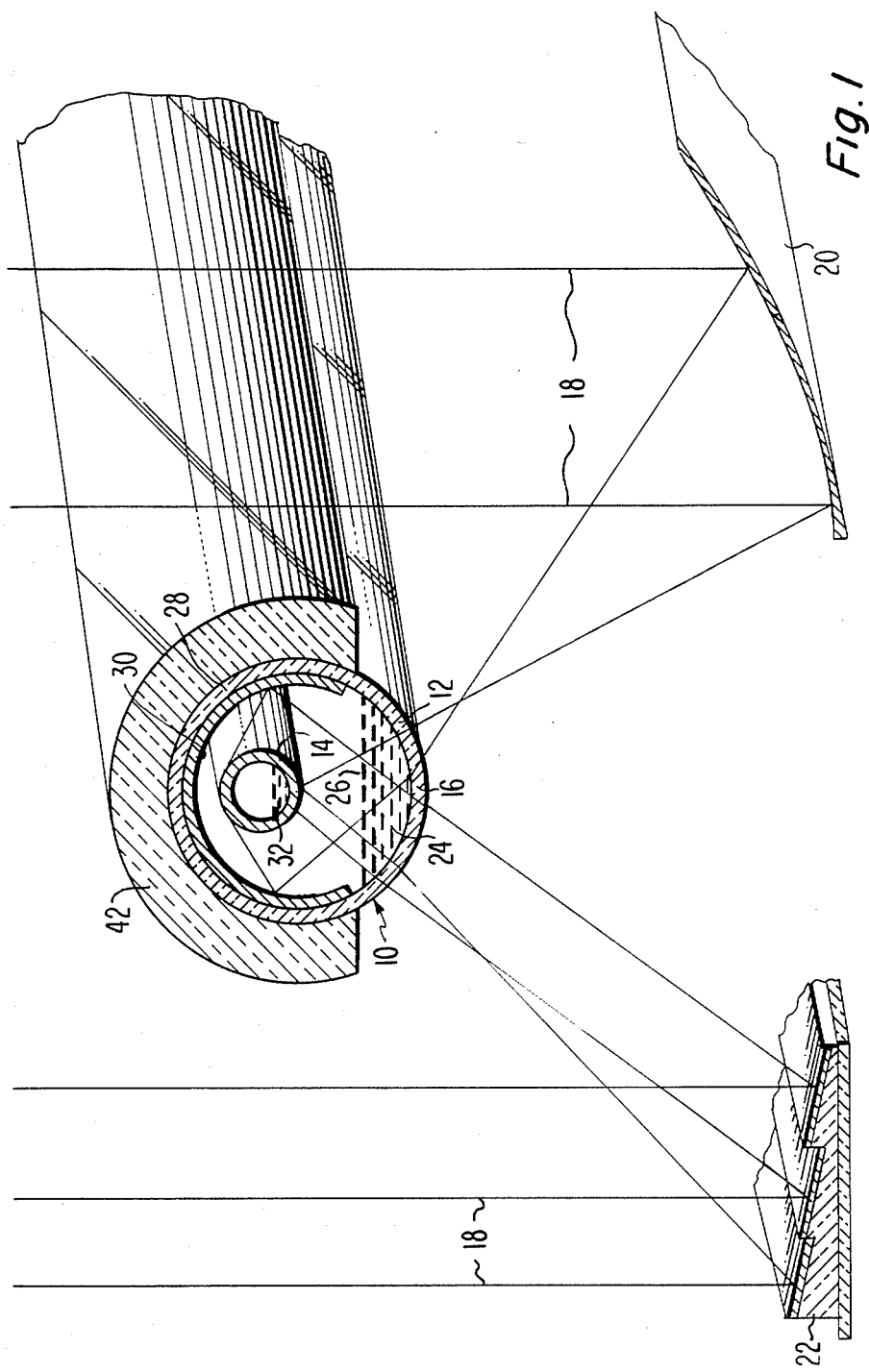
FIG. 1 is a transverse sectional view of a radiant energy collector device, in accordance with the embodiments of the invention.
Figure 2:
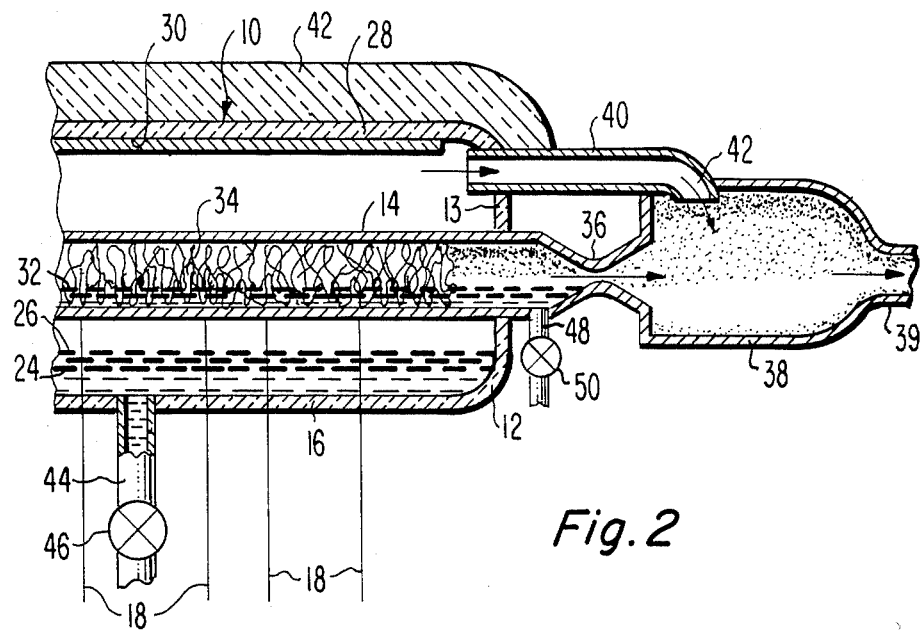
FIG. 2 is a partial longitudinal sectional view of one embodiment of the invention of FIG. 1, wherein additional features of the invention are shown.

FIG. 1 shows a radiant energy device having a hollow collector structure 10 formed with a tubular or globular enclosing wall 12. Mounted within the hollow collector 10 is a target structure 14 of a tubular or globular construction corresponding to the shape of the collector wall 14. If the collector 10 and the target 14 are tubular, they are mounted relative to each other with their axes substantially parallel, as shown in FIG. 2. Target 14 may be supported within and spaced from the collector wall 12 in any appropriate manner, as for example as shown in FIG. 2, wherein the target tube 14 extends through and is supported by a portion 13 of the collector wall 12.

Collector 10 is formed of glass or a plastic material having at least one portion 16 of the wall 12 transparent to the radiant energy to be utilized, such as sunlight. The target 14 is preferably metal with a dark or black color or coating for optimum absorption of the radiant energy.

Radiant energy such as parallel rays 18 of sunlight is collected by a curved concave mirror 20 or an angularly disposed slat mirror 22 to concentrate the solar radiation onto the collector 10 and through the wall portion 16. Within the collector 10 a liquid 24, such as water, which covers the transparent wall portion 16 to a substantial depth, with the free surface 26 of the water forming a horizontal surface spaced below the hollow target 14.

The inner surface of the transparent wall portion 16 is substantially cylindrically concave when the collector 10 and target structure 14 are tubular. Additionally, the inner surface of the wall portion 16 may be substantially spherically concave, if the collector 10 and target 14 are globular. In both embodiments the liquid 24 forms a converging lens for the radiation directed through the transparent wall portion 16. This converging lens action further concentrates the solar radiation toward the target 14. The wall portion 28 of collector wall 12, which is above the liquid 24, is coated or formed with a material 30, which reflects the solar rays which pass through the liquid 24 but do not strike the target 14. The curvature of the wall portion 28, which may be cylindrical or spherical, thus provides a concave mirror to concentrate further the incident radiation toward the target 14.

The hollow target 14 contains a fluid 32, such as water. Because of the concentration of the incoming radiation by the liquid lens 24 and the converging wall surface 30, target 14 can be made relatively small, such that the concentrated radiation quickly heats the water 32 to steam.

Any suitable means may be used to facilitate vaporization of steam in the hollow target 14. For tubular pipes of moderate size (FIG. 2), it is convenient to include a porous, relatively heat-resistant material 34 such as cellulose or glass fibers to absorb the liquid phase in the pipe. Such a material permits direct vaporization of liquid water absorbed in the fibers without any turbulent boiling.

High-pressure steam produced within the target structure 14 may be passed into a steam-jet device (FIG. 2) having a venturi 36 to create a vacuum in a chamber 38. The venturi 36 is connected at one end to the target 14 and at its other end to the chamber 38, as shown in FIG. 2. Chamber 38 may also be a structure separate from tubular target 14 and appropriately connected to the venturi exit of targent 14. Chamber 38 is formed with an outlet 39. The relative sizes of the pipes and nozzles in FIG. 2 are somewhat misleading. In practice, the venturi 36 would be of much smaller diameter than either the collector 10 or target 14.

The high pressure steam issuing into chamber 38 through the venturi 36 forms a partial vacuum in the portion of chamber 38 adjacent to the venturi 36. A tube 40 connects the space within the collector 10 with the inner space of the chamber 38. An orifice 42 of tube 40 is positioned perpendicular to but just outside the flow of high velocity steam from the venturi 36. This is the region of the partial vacuum.

In accordance with a feature of the invention, the partial vacuum formed within chamber 38 is used to remove vapor from the hollow collector 10, if the liquid 24 is volatile, such as water. This facilitates evaporation from the inner surface of the lens 24. This evaporation may proceed at a high rate and keep the liquid lens relatively cool while recovering heat from the liquid lens produced from absorption of incoming radiation 18 and of secondary blackbody radiation from target 14.

While most of the near infra-red radiation and visible light of sunlight pass through the liquid lens 24 to heat the target pipe 14, the longer infra-red wavelengths emanating as blackbody radiation from the target 14 are absorbed at the inner surface of the liquid lens 24. The reflective surface 30 may be formed as an opaque film of aluminum, silver, or another reflective material to aid in directing the incoming radiation to the target 14. A layer of insulation 42 is placed over the reflective portion 28 of the collector wall 12. This further reduces heat loss and helps to avoid condensation of water on the reflecting surface 30.

PRINCIPLES OF THE INVENTION

The invention provides efficient operation utilizing three basic elements: (1) A target 14 to absorb the radiation, (2) A transparent window 16 (in FIG. 1) or glazing to protect the target 14 from excessive loss of heat, and (3) Effective means for the transfer of the energy from the target 14 to its end use. These three basic elements are provided in a way which facilitates inexpensive construction and efficient operation.

The target 14 for the absorption of radiant energy may be either of a small or a moderate size compared to the surface area of the mirrors 20–22 which concentrate the light onto the target. Small targets obtain high temperatures quickly, but precision in construction and alignment are needed to insure that the concentrated rays actually hit the target. The present invention utilizing the liquid lens 24 and the reflective wall surface 30 provides means for using a relatively small target without requiring precision alignment and without large losses of heat.

Normally, glazing placed around a target structure results in considerable loss of energy due to reflection and absorption of radiation by the glazing. The present invention provides a unique liquid-filled window 24 that reduces this loss of energy and serves as a lens or prism to concentrate further the incoming rays to the relatively small target, 14. Water is an effective medium for transfer of heat energy. Water vapor is even more efficient than liquid water for carrying away heat. The present invention provides the means for vaporizing water within the solar collector 10. This permits smaller diameter piping to carry an equivalent amount of heat away from the device for ultimate use. A nonvolatile antifreeze may be used along with water, according to the present invention. The water vapor produced will be substantially pure and can be directly injected into a domestic hot water system without need for heat exchangers. The water of lens 24 absorbs infra-red radiation, especially the wavelengths of blackbody radiation from the target 14, when heated by solar energy. Specifically, the water vapor surrounding the target 14 and the inner surface of the liquid lens 24 both absorb infra-red radiation from the target.

The venturi 36 provides a steam jet at high pressure. The steam exits at high velocity into the chamber 38. The orifice 42, perpendicular to but just outside the area of flow of high velocity steam, is the site of the formation of a partial vacuum, as described. In accordance with a feature of the invention, this partial vacuum is used to aid in the vaporization of the volatile liquid in lens 24 at temperatures as low as 0° C. for water. This cooling action may be utilized to provide a source of chilled water for refrigeration or air conditioning. However, this vacuum system serves even more effectively to recover low-grade heat from the liquid lens 24.

The venturi-generated vacuum actually provides a heat pump effect in permitting evaporation at reduced pressure and temperatures of the liquid lens 24. This vapor from lens 24 admixes with the high velocity steam from target 14 and the over-all pressure at the constricted outlet 39 increases so that the entire amount of heat within the steam can be used.

The liquid 24 in the collector 10 may be replaced through an intake conduit 44 (FIG. 2) controlled by a valve 46. In a similar way, the fluid 32 in the target 14 may be replaced through an inlet pipe 48 through a control valve 50. A source of water for the collector and target may be a reservoir of rain water, deionized tap water, or recycled condensate to avoid build-up of boiler scale. Water containing no dissolved gases is also desirable, as gases tend to form bubbles in the liquid lens 24 interfering with the transmission of light. Additives may be incorporated in the liquid lens 24, such as salts, to increase the refractive index of the lens, increase transmission of infra-red radiation, and/or serve as an antifreeze. Other additives such as glycerol, sugars, or soluble polymers such as gelatin may be used for similar purposes or to increase the viscosity of the liquid lens 24 to reduce convective heat losses. The range of additives is large and inexpensive materials may be selected for their desired properties.

The devices described above and shown in the drawings provide energy for various purposes. Pressurized steam from the target 14 could be used to power a turbine or steam engine prior to its being used to provide heat for a domestic hot water supply. The steam may be condensed to liberate its heat, and the liquid water may be reused. Instead of providing a vacuum within the collector 10 to remove the liquid vapor, a fan could be used to circulate air through the hollow collector 10. The air is thereby heated and humidified to provide space heating. Sea water may be used for the liquid lens 24 and the vapor produced from lens 24 could be condensed and recovered as potable water. A highly hydroscopic material such as lithium bromide could be used in target 14 to extract water vapor from the night air of a desert region passed through the hollow target 14. The desert sun would be used to recover this water by distillation.

Losses of energy from a solar collector to the environment depend on the size, shape, and exposure of the collector to wind, as well as the temperature of the outer surface of the collector. The present invention keeps the outer wall of the collector 10 relatively cool because of evaporation taking place at the inner surface of the liquid 24. When used for providing space heating, for example, air passed through the collector 10 may reach only 20° C. but have close to 100% humidity. Such moisture-laden air carries considerably more heat than dry air, but the outer wall of the transparent collector will lose relatively little heat because it is kept cool.

The basic design of FIG. 1 and 2 may be modified to provide a cover of glass or plastic for the inner surface of the liquid lens, 24. If the liquid lens is thus completely enclosed, heat may be recovered from the liquid of the lens by circulating it through a separate evaporator.

Another feature of the invention is to use high molecular weight gases such as carbon dioxide or halogenated hydrocarbons to fill the space between the covered liquid lens 24 and the target pipe 14. Such gases would be selected for their properties of infra-red absorption and the fact that heat losses from conduction in a gas decrease with an increase in the molecuoar weight of the gas.

Such high molecular-weight gases such as Freon (a halogenated hydrocarbon) could be used for heat transfer and as liquids to comprise the liquid lens. Gaseous Freon above the liquid lens would provide favorable characteristics in reducing heat loss from the target while Freon within the target 14 would generate very high pressures. Because of the high cost of Freon (compared to water) such a system must be a closed cycle, and all of the vapor sucked out by the Venturi must be recycled after it is condensed to release its heat. A similar system could be used with carbon dioxide especially if combined with a liquid absorbent such as an aqueous solution of sodium carbonates or an organic amine. Higher pressures are required to maintain carbon dioxide as a liquid in its pure state, so its use alone may be impractical. An alkaline liquid, however, is capable of dissolving large quantities of carbon dioxide at moderate pressures and such a liquid could be used for the liquid lens. In this case heat absorbed by the liquid would drive out carbon dioxide which is removed by the venturi. The carbon dioxide would go into liquid phase again when it comes into contact with an alkaline liquid formed in the liquid lens and recycled in a condenser which releases the heat generated by the reabsorption of the carbon dioxide.

Figure 3:
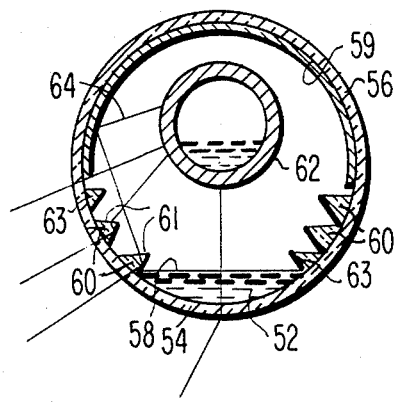
FIG. 3 and FIG. 4 are transverse sectional views of further embodiments of the invention.

A further embodiment of the invention is in the use of liquid lenses of either spherical and/or segmental configuration. A cylindrical lens structure is shown in cross-section in FIG. 3. A cylindrical liquid lens 52 of the type of lens described above for lens 24 is formed from the cylindrically concave bottom wall portion 54 of a horizontally disposed tubular member 56 formed of glass or other appropriate plastic material, transparent to the radiant energy, such as sunlight to which the device is exposed. The free horizontal surface 58 of the liquid lens 52 forms with its bottom surface a converging lens. A reflective coating 59 coats the upper inner surface of collector 56. Running parallel with the horizontally disposed member 56 are parallel hollow ribs or ridges 60, having a triangular cross-section as shown in FIG. 3 with flat faces 61 substantially horizontal and other faces 63 forming sharp angles with the vertical. Ribs 60 are transparent or reflective for collecting radiation directed onto the collector wall 54 and directing such radiation toward a tubular metal target 62, similar to target 14 described above.

The ribs 60 are attached longitudinally to the inner wall of the transparent collector 54. Such ribs 60 are easily constructed of glass or plastic attached in a watertight manner to the transparent collector cylinder 54. Alternatively, the ribs 60 may be manufactured as an integral part of the cylinder by extrusion from a die. The ribs 60 are transparent and are coated with a reflective surface on the faces 63. For simplicity, the transparent ribs 60 may have the same refractive index as the liquid used to fill the lens 52.

The ribs 60 permit the composite lens 52 to be far thinner and require less liquid than a comparable liquid-filled lens alone. At certain angles of incident rays, the ribs 60 may act as prisms in refracting light and in producing total internal reflection as shown in the ray tracing of FIG. 3. Both reflection and refraction may be used to direct light to the target 62. Designs other than cylindrical shape of collector 56 may be used: Parabolic troughs, spherical, and planar geometries are among designs which can be tailored to the optical requirements for such a collector. The meniscus of some liquids within the ribs 60 forms an important part of the optical system especially when the ribs are constructed close together. The glazing for the target may also consist of a thin sheet of water or other liquid with no ability to concentrate radiation but having the ability to absorb longer wavelengths of blackbody radiation. Such a simple glazing could be used to regulate the temperature of a greenhouse.

The liquid lenses of the present invention and shown in the modifications described, take on a particular shape due to the shape of the respective transparent collectors and gravity. For example, the transparent surface of the collector 10 does not have to be made rigid, but may be constructed from a thin flexible plastic film with its shape produced by supporting the edges of the plastic or by inflation of a closed envelope which forms the collector 10 by gas under pressure.

Figure 4:
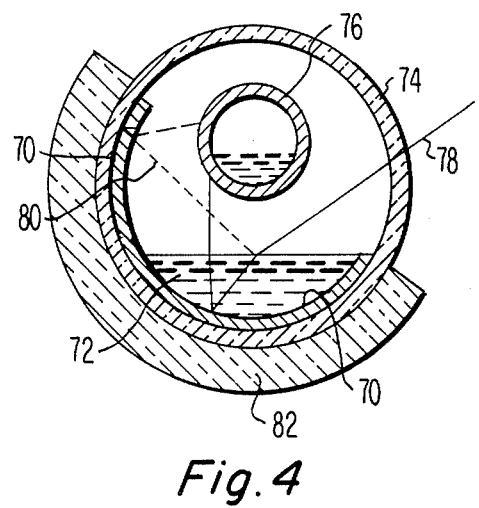

FIG. 4 shows a solar collector wherein the primary reflective surface 70 is included below the liquid lens 72 formed within a hollow tubular or globular collector 74 as described above for the corresponding structures of FIGS. 1 and 2. A hollow target structure 76 is enclosed within the collector 74, as also described above. For incoming rays of light at an angle, such as ray 78, as may occur when the sun is low in the sky, a portion 80 of the light will be reflected directly from the top surface of the liquid lens 72 and, in turn may be reflected from mirrored surface 70 of the collector 74 and directed onto the target 76. Insulation material 82 is included around surfaces of collector 74 not receiving incoming radiation. For a solar collector in the Northern Hemisphere with a long axis in the east-west direction, the northern and lower sides of the collector would be insulated.

Figure 5:
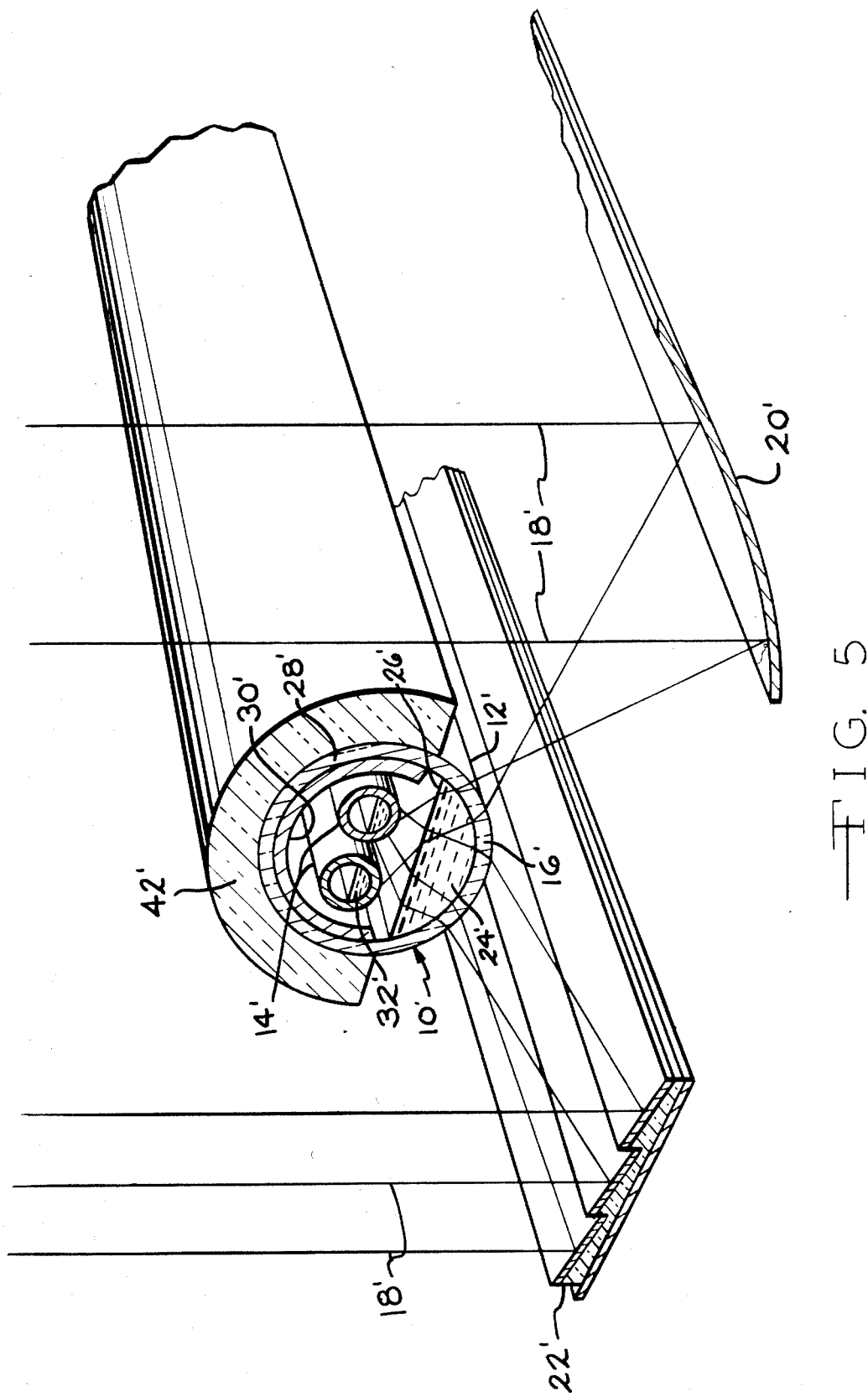
FIGS. 5, 6, and 7 are transverse sectional views of embodiments of the invention showing a plurality of boiler pipes.

FIG. 5 shows an embodiment of the invention corresponding to FIG. 1 but demonstrating a plurality of boiler pipes 14', a volatile liquid within said pipes, at least one of said pipes arranged at the principal focus of said fluid lens at different angles of incidence of rays directed to the collector structure 10' formed with a tubular enclosing wall 12'. A portion of collector 10' is formed of glass or plastic material having at least one portion 16' transparent to the radiant energy utilized. Radiant energy such as parallel rays 18' is collected by a curved concave mirror 20' or an angularly disposed slat mirror 22'. Within the collector 10' a liquid 24' covers the transparent wall portion 16' with the free surface 26' forming a horizontal surface spaced below the hollow target pipes 14'. The wall portion 28' of collector wall 12' is coated or formed with a material 30' which reflects rays which pass through the liquid 24' but do not strike the target 14'.

Figure 6:
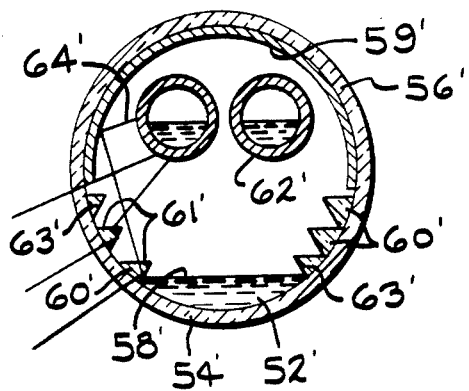

A layer of insulation 42' is placed over the reflective portion 28' of the collector wall 12' to reduce heat loss and avoid condensation of water on the reflecting surface 30'. The hollow target pipes 14' contain a fluid 32' such as water which turns to steam by heat from the concentrated radiation. FIG. 6 shows a cylindrical lens structure in cross-section. A cylindrical liquid lens 52' is formed from the concave bottom wall portion 54' of a horizontally disposed tubular member 56' formed of glass or other appropriate plastic material, transparent to the radiant energy, such as sunlight to which the device is exposed. The free horizontal surface 58' of the liquid lens 52' with its bottom surface forms a converging lens. A reflective coating 59' coats the upper inner surface of collector 56'. Running parallel with the horizontally disposed member 56' are parallel hollow ribs or ridges 60' with flat faces 61' substantially horizontal and other faces 63' forming sharp angles with the vertical. Ribs 60' help direct radiation onto collector wall 54' toward the tubular metal targets 62'.

Figure 7:
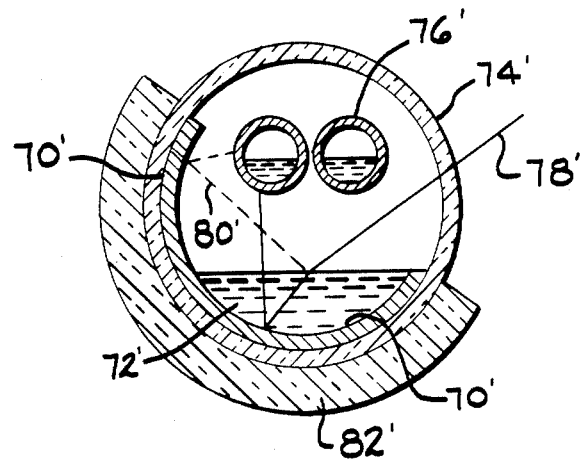

FIG. 7 shows a solar collector similar to FIG. 4 wherein the primary reflective surface 70' is included below the liquid lens 72' formed within a hollow colector 74'. Target structures 76' are enclosed within the collector 74'. For incoming rays such as 78' a portion 80' of the light will be reflected from mirrored surface 70' of the collector 74' and directed onto the targets 76'. Insulation material 82' is included around surfaces of collector 74' not receiving incoming radiation.

By varying the level of fluid and/or the composition of the fluid within the liquid lens, the focus and other optical properties of the liquid lens may be changed. The level of liquid of the lens may thus be varied to optimize the focus of radiation onto the target in synchronism with the change in the direction of incoming radiation due to the time of day or season. Thus, a unique method of solar tracking may be provided.

Solar tracking has generally been necessary for concentrative solar collectors and required mechanical devices either for turning the mirrors towards the sun or varying the target's position as the sun moves through the sky. The advantage of changing the characteristics of a liquid lens to maintain a focus of radiant energy lies in the simplicity and effectiveness of this method. The invention provides a lens where optimal characteristics may be varied continuously. Light is refracted at the interface of the liquid lens with the transparent walls shaping its lower surface and at the free surface of the liquid lens. By raising the level of the liquid, a thicker lens is created, and the focus of radiant energy will be moved away from its first positions. As the sun rises in the sky, its radiant energy might produce a focus too low for the target. By permitting the level of liquid to rise in the liquid lens, the focus can be corrected. An alternative method for adjusting the focus is to change the composition of the liquid lens. Salt water might be pumped in to replace fresh water in the lens. Salt water has a higher refractive index, and therefore the lens of salt water will bend or refract light more strongly, decreasing the focal length.

The cooling effect of the liquid lens may be used to advantage when the target is a photovoltaic cell, or other photo-device, whos temperature optimally is kept relatively low despite the concentration of light directed on it. Other targets intended for attaining a very high temperature would lose large amounts of black-body radiation unless this radiation is recovered by absorption at the liquid lens.

The partial vacuum within the collector 10 may be used to suck in more water through control valve 46 to replenish that evaporating from the liquid lens 24. When an absorbant material such as cellulose fibers is used for holding water in the target structure, as described above, the replenishing of water in the target may be accomplished by capillary action.

Condensed steam from a radiant energy collector may also be reused in the system. A vapor pump or compressor may be used to augment the output of vapor from the target boiler and/or from the liquid lens by drawing off vapor at a lower temperature and pressure than otherwise would be possible. When an injection of steam is made directly from the collector or target structures into a hot water tank or a water pipe, on contact the liquid water is heated as the steam condenses.

In some applications where little or no tracking of the sun is desired, more than one boiler pipe may be provided within the collector, each attached to a one-way valve for exiting steam to a common outflow pipe. At different angles of incident solar radiation, the various boiler pipes will be strongly heated, but steam will be provided from whichever pipe is the principle focus of radiation at a given time.

Because the invention uses an inexpensive liquid lens to concentrate the radiant energy onto the final target, the quality of the mirrors 20 to direct light through the liquid lens need not be high. In fact, shiny aluminum foil would be adequate as reflectors if a suitable rigid backing is provided. Because the mirrors or primary reflecting surface could be very cheaply constructed, a large primary reflecting surface may be used with a modest-sized liquid lens and a relatively small target pipe.

Although the fluid of the lens 24 has been described as being water in most embodiments, it is not restricted to water as such fluids as hydrocarbons, other oils, alcohols, acids, glycols, ketones, aldehydes, ethers, amines, and halogenated organic compounds can be used. Additives can be included in the fluid of the lens, such as an inorganic salt, an acid, or an alkali soluble in the fluid to alter its refractive index, or its melting or boiling point, its viscosity or the absorption or emissivity of radiant energy by the fluid lens.

Having thus set forth the nature of the invention, what is claimed is:

1. a radiant energy device comprising a hollow collector having an enclosing wall, a target structure having a dark, heat-absorbing outer surface, enclosed within and spaced from said hollow collector wall, a portion of the inner surface of said collector wall having a concave curvature, a volatile fluid transparent to said radiant energy but being absorptive of longer wavelengths of infra-red radiation within said concave wall portion and having a surface spaced from said target structure whereby said fluid forms a lens for converging radiant energy through said enclosing wall to said target structure, another portion of the inner surface of said collector wall being reflective to said radiant energy and extending around said target structure to direct radiant energy passing through said converging lens toward said target structure whereby said fluid is heated and vaporized by radiation emanating from said target structure, and means for removing the vapor of said volatile fluid includes means for providing a partial vacuum within said hollow collector.

2. A radiant energy device in accordance with claim 1, wherein said target structure is hollow, a volatile liquid within said hollow target structure to be heated by said radiant energy directed thereto, said fluid within said hollow collector being volatile whereby vapor of said fluid fills said hollow collector above the surface of said lens, a tubular venturi connected at one end to said target structure for the passage therethrough at high velocity of vapor of said liquid within said hollow structure, an expansion chamber connected to the other end of said venturi and to said hollow collector to provide a region of lower pressure than the pressure of said fluid vapor within said hollow collector to remove said fluid vapor from said collector.

3. A radiant energy device comprising a hollow collector having an enclosing wall, a target structure enclosed within said collector wall, a portion of the inner surface of said collector wall being transparent to said radiant energy and having a concave curvature, a volatile fluid transparent to said radiant energy but being absorptive of longer wavelengths of infra-red radiation within said concave wall portion and having a free horizontal surface spaced from said target structure, whereby said fluid forms a lens for converging radiant energy directed through said concave wall portion to said target structure and wherein said collector wall forms a closed hollow structure, said transparent fluid being volatile whereby said hollow collector above the free surface of said fluid is filled with vapor of said fluid and means for removing said fluid vapor from said hollow collector and wherein said means for removing said fluid vapor includes a venturi means connected to said target structure.

4. A radiant energy device in accordance with claim 3 wherein said collector wall is a closed hollow structure formed of a flexible plastic sheeting, said transparent fluid being volatile whereby heat from said radiant energy vaporizes said fluid to fill said closed hollow structure with the vapor of said liquid at a pressure to retain the shape of said structure.

5. A radiant energy device in accordance with claim 3 including a rib structure on the inner surface of said collector wall and extending parallel to and spaced above the free horizontal surface of said fluid lens, said rib structure being transparent to said radiant energy and arranged to converge radiant energy directed therethrough onto said target structure.

6. A radiant energy device in accordance with claim 5, wherein said rib structure comprises a plurality of ribs each having a triangular cross-section and a flat face thereof extending substantially horizontally.

7. A radiant energy device in accordance with claim 3, including a high molecular weight gas filling the space within said hollow collector above said fluid lens to absorb infra-red radiation within said collector.

8. A radiant energy device in accordance with claim 3 wherein said fluid of said lens is an aklaline liquid with dissolved carbon dioxide gas, and carbon dioxide gas filling the space within said hollow collector above said fluid lens to reduce heat loss from said collector by conduction.

9. A radiant energy device in accordance with claim 3, wherein said target structure comprises a plurality of boiler pipes, a volatile liquid within said pipes, at least one of said pipes arranged at the principal focus of said fluid lens at different angles of incidence of said radiant energy directed onto said collector wall portion.

* * * * *